Feb. 16, 1943.   R. L. MEYERS   2,311,066
SEPARATOR DISK SCRUBBING MACHINE
Filed Sept. 29, 1941
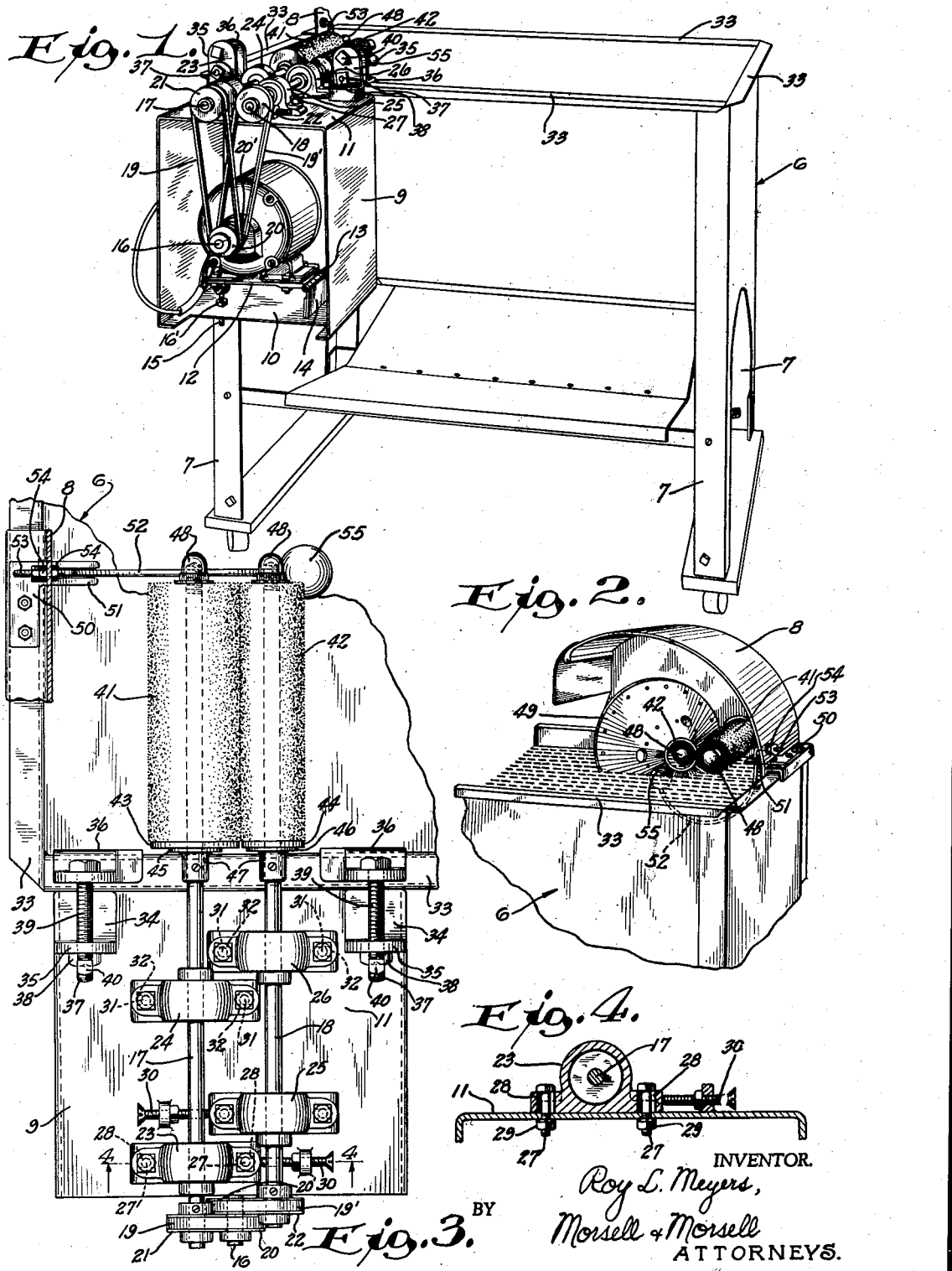
INVENTOR.
Roy L. Meyers,
BY Morsell & Morsell
ATTORNEYS.

Patented Feb. 16, 1943

2,311,066

UNITED STATES PATENT OFFICE 2,311,066

SEPARATOR DISK SCRUBBING MACHINE

Roy L. Meyers, Janesville, Wis.

Application September 29, 1941, Serial No. 412,744

3 Claims. (Cl. 15—21)

This invention relates to improvements in separator disk scrubbing machines.

In the dairy industry milk and cream separators are utilized which include so-called removable disks which are in fact funnel shaped. Sanitation is a very important factor in this industry and the separator disks must be subjected to very thorough washing and scrubbing operations, which washing and scrubbing should be applied to both the interior and exterior surfaces of the disks.

Scrubbing machines for the above noted general purpose are now in commercial usage and include a pair of driven rotary brushes operating in or over a tank. The brushes are motor driven and the motor is also utilized, in the prior art apparatuses, to drive a pump for the purpose of spraying water onto the brushes and onto and into the disk being cleaned. The use of a pump with an apparatus of this nature complicates the mechanism and renders certain of the parts and connections more or less inaccessible for repairs and replacements.

A primary object of the present invention is to provide a simple and effective separator disk scrubbing machine which eliminates the need for a pump and in which the disk being operated on is revolved within the tank of cleaning liquid in a manner so that the liquid is thrown and directed onto all surfaces of the disk and the revolving brushes.

A further object of the invention is to provide a separator disk scrubbing machine wherein the revolving brush shafts are driven through belt means from the motor shaft, with the arrangement being such that the belts and shaft pulleys are readily accessible for repairs, replacements, and adjustments.

A further object of the invention is to provide a separator disk scrubbing machine wherein the driven brush shafts are mounted on an open accessible portion of the machine and are journalled in self-alining, adjustable bearings to which access is readily afforded.

A further object of the invention is to provide a separator disk scrubbing machine wherein the bearing members for the brush shafts may be laterally adjusted to "toe in" the brush ends of said shafts to compensate for wear on the brushes and to maintain proper pressure on a separator disk engaged by the brushes.

A further object of the invention is the provision, in a separator disk scrubbing machine, of adjustable mountings for the driven brush shafts together with a compensating mounting and arrangement of a motor which will aid in keeping the brush shaft bearings in properly adjusted position.

A further object of the invention is the provision of a compact unitary assembly including an electrical motor, brush shafts and mountings therefor, and connections between the motor and shafts, the entire assembly being adapted for attachment to or ready removal from a wall portion of a conventional tank.

A further object of the invention is to provide a separator disk scrubbing machine having a simple and effective, readily adjustable device for retaining a disk in engagement with the brushes to be revolved in the tank by the brushes.

A further object of the invention is to provide a separator disk scrubbing machine which is of very simple construction, which is strong and durable, which is easy to service, repair and adjust, which is inexpensive to manufacture, which requires a minimum of parts, and which is well adapted for the purposes described.

With the above and other objects in view the invention consists of the improved separator disk scrubbing machine, and its parts and combinations as set forth in the claims, and all equivalents thereof.

In the accompanying drawing in which the same reference characters indicate the same parts in all of the views:

Fig. 1 is a perspective view of the improved separator disk scrubbing machine with the protective hood for the brush end of the tank broken away and in section;

Fig. 2 is a fragmentary perspective view of a corner portion of a tank showing the manner in which a separator disk is engaged by the revolving brushes and further showing the protective hood applied over the brushes and disk;

Fig. 3 is an enlarged fragmentary plan view, with part broken away and in section, of the end portion of the tank to which the brush and motor assembly is detachably applied; and Fig. 4 is a transverse detailed sectional view taken on line 4—4 of Fig. 3.

Referring now more particularly to the drawing, it will appear that a suitable rectangular open top tank or washing receptacle is indicated generally by the numeral 6 and said tank is supported on suitable leg members 7. The interior of the tank proper may be divided by a partition (not shown) into a washing zone, in the neighborhood of the brushes, and a rinsing zone, at the other end of the tank or receptacle. Over an end corner portion of the tank, to which the improved scrubbing mechanism assembly is applied, there is a conventional protective hood 8.

The improved motor and scrubbing mechanism assembly comprises a box-like enclosure 9 having an open outer face and a lower horizontal wall or shelf 10, and an upper horizontal wall or shelf 11. Mounted on the lower shelf or wall 10 is a hinged or pivotal motor supporting plate 12. As shown in Fig. 1, the inner end of this plate is hingedly connected in an elevated position as at 13 to a vertical flange 14. The free end of this plate carries a depending elongated bolt 15 projecting through a suitable aperture in the wall of shelf 10 and retained in an adjusted position of elevation by a nut 16'. By adjusting the nut 16' on the bolt 15 the elevation of the motor carrying plate 12 may be varied or adjusted to regulate the distance between the motor shaft 16 and elevated brush shafts 17 and 18. The tautness of driving belts 19 and 19' may thereby be regulated.

The outer end of the motor shaft 16 carries fast thereon a double driving pulley having separate grooved portions 20 and 20', and the adjacent extremities of the brush shafts 17 and 18 likewise carry fast thereon pulleys 21 and 22 respectively, which are vertically aligned, respectively, with the grooved portions 20 and 20' of the motor shaft pulley. The brush shafts 17 and 18 are revolved in opposite directions by the endless belts 19 and 19'. The belt 19 engages the pulleys 20 and 21, while the belt 19' engages the pulleys 20' and 22.

On the top surface of the upper wall 11 of the enclosure 9 there are mounted in substantially longitudinal alinement a pair of self-alining bearings 23 and 24 for the brush shaft 17. Likewise, the brush shaft 18 is similarly journalled in self-alining bearings 25 and 26, it being noted that the bearings 25 and 26 are staggered with relation to the bearings 23 and 24. The bearings 23 and 25 are each mounted on the wall 11 by means of vertical bolts 27 passing through elongated slots 28 in the side ears of the bearing casing and extending through the portions of the wall 11. The lower ends of the bolts 27 carry nuts 29 and lock washers. When the nuts are loosened the bearings 23 and 25 may be shifted in either direction laterally of their normal positions by turning inwardly or outwardly on adjusting screws 30, and subsequently re-securing the nuts 29.

As will hereinafter more fully appear, it may ultimately be desirable to adjust the bearings 23 and 25 outwardly so as to cause the brush ends of the shafts 17 and 18 to "toe in" slightly, and the present arrangement permits this to be accomplished very easily, and obviously, when desired, the bearings 23 and 25 may be readjusted to their normal positions. The forward bearings 24 and 26 are likewise secured on the wall 11 by bolts 31 extending through enlarged slots 32 in the bearing flanges whereby said bearings may be adjusted laterally, if desired, although in actual practice the adjustments of the bearings are more frequently accomplished through the rear bearings 23 and 25.

The assembly carried by the enclosure 9 is adapted for removable mounting along any desired corner wall portion of the tank or receptacle 6. Tanks of this nature are ordinarily formed with outwardly struck peripheral flanges 33. The inner end of the top wall 11 of the enclosure 9 has mounted fast thereon in spaced relation a pair of clamp lugs 34 which include vertical ears 35. Adjustably associated with the stationary clamp lugs 34 are movable clamp lugs 36 having lower horizontally and then downwardly struck portions to engage portions of the peripheral flange 33 of the tank. Said movable clamp lugs 36 have vertical apertured ears through which are extended bolts 37. The outer ends of the bolts 37 extend through apertures therefor in the vertical ears 35 of the fixed lugs 34 and have threaded thereon nuts 38 whereby the lugs 36 are secured to the fixed lugs 34 and clampingly engage the tank flange 33. Cooperating positioning bolts 39 whose rearward ends are headed as at 40 extend through openings in the ears 35 and have their other ends impinged against the upstanding ears of the adjustable clamp lugs 36.

The brush shafts 17 and 18, as will be observed from Figs. 1 and 3, are of substantial length and extend over a portion of the end of the tank or receptacle 6. The extended portions of said shafts have fast thereon cylindrical brushes 41 and 42 respectively. The inner ends of the brushes are lodged against rubber disks 43 and 44 which are clamped on the shafts 17 and 18 against metallic collars 45 and 46 respectively, with the latter being held in position by fixed shaft collars 47. The outer ends of the brush shafts 17 and 18 have threaded thereon retaining caps 48. These caps are mounted on the shafts by screw threads directed opposite to the direction of rotation of the shafts. It will be observed that the diameter of the brush 41 is somewhat larger than the diameter of the cooperating brush 42.

In actual practice the receptacle or tank 6 is filled with a washing liquid to about the level shown in Fig. 2. A separator disk to be cleaned, indicated by the numeral 49, is mounted on the brush 42 in a manner so that a wall portion thereof is impinged between the brushes 42 and 41. Hence, the brush 42 becomes effective to scrub and clean interior surfaces of the disk 49, while the brush 41 is effective to scrub exterior surfaces of the disk. Due to the close adjacency of the two brushes the disk will be held thereon. In actual practice, if the bristles of the brushes are of bronze or stainless steel, it is desirable to include a mechanism for retaining a disk in engagement with the brushes, and in a manner so that the brushes will revolve the disk. For this purpose there is secured onto a portion of the flange 33 of the receptacle 6 a bracket 50 having an inwardly extending horizontal slotted guide and supporting plate 51. The upward extension of a curved and bendable brass rod 52 passes through the slot in said plate 51 and then terminates in an angular extension 53 which passes through an aperture in an upwardly directed wall portion of the hood 8 or other metallic flange. Said extension portion 53 of the rod is threaded and carries, on both surfaces of the hood, lock nuts 54. By this means the rod is longitudinally adjustable relative to its support, and the plate 51 retains it against undesired lateral deflection. The major portion of the rod 52 is bent in the form of a U and is intended to extend into the receptacle, as best shown in Fig. 2, approximately underlying the ends 48 of the brush shafts. The free upwardly directed end of said rod has secured thereto a ball 55 preferably formed of hard wood. To mount the separator disk 49 relative to the brushes, or to remove it therefrom, the rod 52 may be flexed. When the disk is mounted, as in Fig. 2, the ball 55 should firmly contact an outer surface portion of the disk serving to hold it firmly in position in a manner so that the brushes will revolve it. Adjustments of the rod to properly position the ball relative to the disk are made as previously mentioned, and also through the simple means of bending the rod as desired. The ball 55 can not interfere with the brushes or other mechanism and will not injure the metal of a disk. The disk extends substantially into the washing liquid in the receptacle and this, together with the novel construction, eliminates the need for a pump. Both brushes 41 and 42 revolve at a high rate of speed and the movement of the brushes tends to move or turn the disk, thereby causing the cleaning fluid to be thrown up and onto all interior and exterior surfaces of the disk. The protective hood 8 prevents undesired splashing.

The shaft bearings 23, 24, 25, and 26 are of the yielding or self-oiling type and therefore in normal operations permit said shafts to retain their proper positions. Due to the adjustable feature of the bearings heretofore described, the brush ends of the shafts may be "toed in" slightly, if desired. This may be advantageous where the brushes are slightly worn and when it is desired to have firm engagement as between the disk 49 and the brushes. The manner in which the brushes are mounted on the shafts 17 and 18 permits their ready removal for replacements when unduly worn, and for cleaning when necessary.

It will be noted that each brush shaft is driven from the motor shaft by an independent belt and this is of particular advantage as the proper tautness of the belts may be maintained and each shaft may be independently adjusted without affecting the drive for the other shaft. Also, this arrangement does not impose a braking or dragging effect on either of the shafts and reduces strain and wear on the belts to a minimum.

The assembly housed by the enclosure 9 is entirely accessible at all times and it will be appreciated that belts may be readily removed and replaced when necessary and that proper adjustments may be made for the shafts 17 and 18 with facility and ease. The assembly carried by the enclosure 9 is self-contained and unitary and may be removed from or applied to any portion of a tank or other receptacle.

From the foregoing description it will be seen that the improved separator disk scrubbing machine is of simple and novel construction and is well adapted for the purposes described.

What is claimed as the invention is:

1. In combination, an open, liquid containing washing receptacle, an open support removably mounted on a side wall of the receptacle below the upper edge portion thereof, a pair of substantially parallel brush carrying, revoluble shafts projecting over the open receptacle to engage and support an article to be scrubbed, laterally adjustable bearings mounted on the top of said support in which portions of the shafts are journalled, and driving means carried by said support and extending to said shafts.

2. In combination, an open, liquid containing washing receptacle, a box-like support having upper and lower horizontal shelves and an open front mounted on an upper side wall portion of said receptacle, two pairs of bearings laterally adjustably mounted on the upper shelf of said support, brush shafts each having its outer end portion journalled in a pair of said bearings and the inner ends of said shafts projecting over the washing receptacle, brushes fast on the projecting inner ends of said shafts, an electric motor vertically adjustably carried by the lower shelf of said support, said motor having a drive shaft, and independent belt connections between the motor drive shaft and each brush shaft.

3. In combination, an open, liquid containing washing receptacle, a support mounted on the receptacle adjacent an upper side wall portion thereof, a pair of substantially parallel brush carrying revoluble shafts projecting over the open receptacle, elongated cylindrical brushes fast on the projecting portions of said shafts, peripheral portions of said brushes being in close adjacency for impinging a portion of an article to be scrubbed, a malleable arm having one end thereof adjustably supported adjacent a side portion of the receptacle and having its free end terminating adjacent a brush, a spherical weight carried by the free end of said arm to yieldingly bear against an exterior portion of a brush engaged article to releasably hold the latter in engagement with the brushes, adjustable bearings mounted on said support in which other portions of the brush shafts are journalled, and driving means carried by said support and extending to said shafts.

ROY L. MEYERS.